Figure 1:
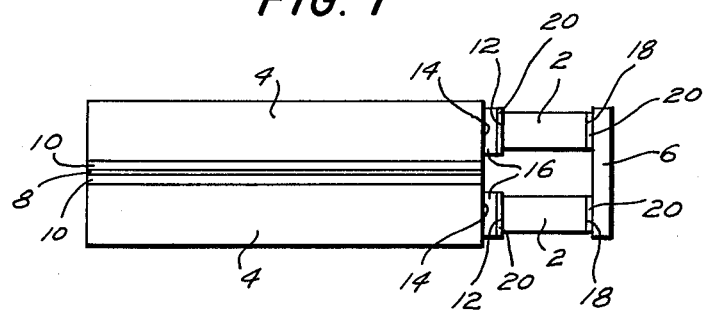

Nov. 12, 1963        L. R. HILL        3,110,100
METHOD OF BONDING BISMUTH-CONTAINING BODIES
Filed Jan. 11, 1962

INVENTOR.
LAWRENCE R. HILL
BY James and Franklin
ATTORNEYS 3,110,100
METHOD OF BONDING BISMUTH-CONTAINING BODIES Lawrence R. Hill, Short Hills, N.J., assignor to General Instrument Corporation, Newark, N.J., a corporation of New Jersey
Filed Jan. 11, 1962, Ser. No. 165,581
6 Claims. (Cl. 29—473.1)

The present invention relates to an improved method for securing an effective bond between bismuth-containing bodies and other objects, and particularly to the obtaining of such a bond which results in a minimal contact resistance between the bismuth-containing bodies and the objects bonded thereto.

The problem of bonding objects to bismuth-containing bodies so as to produce a strong physical bond and minimal electric contact resistance therebetween presents great difficulty from a production point of view. The problem is particularly acute in connection with the bonding of nickel, iron or steel conductors or terminals to bismuth telluride thermoelectric bodies. The objects to be bonded to such bodies, or at least the surfaces thereof in engagement with the bodies, must be composed of only a limited number of substances, in order not to contaminate the bodies and destroy their thermoelectric properties. From a practical point of view, with bismuth telluride thermoelectric bodies, the objects attached thereto must be formed of nickel, iron or steel. These substances do not readily bond to bismuth telluride. In the absence of a truly effective bond the contact resistance between the bodies and objects becomes excessively great, and correspondingly reduces the thermoelectric efficiency of the bodies. Moreover, since the bodies, in use, are often subjected to relatively wide cyclic temperature variations, and since the bodies and the objects connected thereto have different temperature coefficients of expansion, the bond produced should be sufficiently strong to withstand the stresses incident upon differential expansion of the bonded elements without bond deterioration, thereby to maintain the required low value of contact resistance as well as to maintain the integral nature of the bonded assembly. Various expedients have been utilized in the past for bonding of this type, but all have presented appreciable difficulties from a production point of view, and have therefore caused the bonded assemblies to be relatively expensive.

I have discovered that the bonding of bismuth-containing bodies such as bismuth telluride thermoelectric bodies to nickel, iron or steel objects such as terminals may be readily accomplished, in a manner well adapted to inexpensive quantity production. More specifically, bismuth members, preferably in the form of thin shims or wafers, are interposed between the confronting surfaces of the bodies and objects which are to be bonded to one another, the bodies and objects are pressed against the interposed bismuth member, and the entire assembly is immersed in a bath including palmitic acid or stearic acid or combinations thereof, palm oil being quite effective, the bath being maintained at a temperature higher than the melting point of bismuth. The interposed bismuth member bonds itself securely both to the bismuth-containing body and the nickel, iron or steel object, without any appreciable deterioration of the thermoelectric properties of the bismuth containing body, and a highly satisfactory value of contact resistance between the body and the object results.

Figure 2:
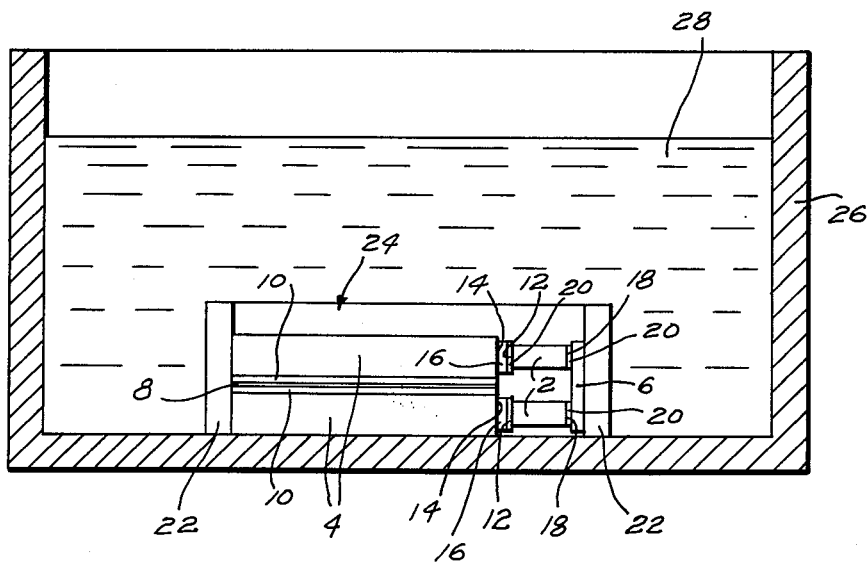

To the accomplishment of the above, and to such other objects as may hereinafter appear, the present invention relates to a method of bonding bismuth-containing bodies to other objects, as defined in the appended claims, and as described in this specification, taken together with the accompanying drawings in which:

FIG. 1 is an idealized side elevational view of one type of assembly which can be produced in accordance with the present invention; and FIG. 2 is a cross-sectional view through an appropriate bath within which the assembly is placed for bonding purposes.

The invention is here specifically disclosed in connection with the formation of a thermoelectric sub-assembly comprising a pair of bismuth telluride thermoelectric bodies 2 which are assembled with combined electrodes and heat detectors 4, and which are appropriately electrically connected to one another by means of a connector element 6. Such sub-assemblies are designed to be used as modules in connection with the construction of relatively large heat-transfer devices. They may assume various sizes and shapes, and the particular construction here illustrated is in many respects idealized, and with parts thereof departing from their true relative sizes, all for purposes of ready explanation. It will be understood that the invention is applicable to use in assemblies and subassemblies of widely varying specific constructions.

The thermoelectric bodies 2, as has been mentioned, are formed of appropriately doped bismuth telluride. The combined electrodes and heat conductors 4 may be formed of copper, and are bonded to and insulated from one another by a mica or other insulating sheet 8 sandwiched between layers 10 of appropriate bonding material such as epoxy resin. The end surfaces 12 of the thermoelectric bodies 2 should not be in contact with copper. Accordingly, the end surfaces 14 of the copper bodies 4 to which the thermoelectric bodies 2 are to be bonded are provided with nickel plating 16. The other end surfaces 18 of the thermoelectric bodies 2 are to be bonded to the element 6 which provides electrical connection between them. The element 6 may be formed of nickel or nickel plated copper, and may also be formed of iron or steel, without adversely affecting the thermoelectric properties of the bodies 2.

In accordance with the present invention thin members 20 formed of bismuth are interposed between the end surfaces 12 and 18 of the thermoelectric bodies 2 and the surfaces to which those bodies are to be bonded. These members 20 may be in the form of shims or wafers. It is not essential that they be very thin, but thinness is desirable in order to minimize the amount of bismuth employed.

The various parts, as above described, are assembled in desired relationship and are then pressed against one another in any appropriate manner, as by being received between the arms 22 of a clamp generally designated 24, the copper bodies 4 having previously been bonded to one another with the mica sheet 8 therebetween so as, at this stage of manufacture, to define an integral element.

The thus clamped assembly is then immersed in a tank 26 containing a bath 28 the composition of which comprises palmitic acid, stearic acid, and combinations thereof. Palm oil is quite effective for this purpose. The bath 28 is brought to a temperature above the melting point of bismuth. That melting point is approximately 270° C. Good results have been obtained with the bath 28 maintained at a temperature of approximately 300° C.

The bath 28 appears to have the effect of completely removing any bismuth oxide which may have formed on the surfaces 12 and 18 of the thermoelectric bodies 2, and of keeping those surfaces 12 and 18 free of bismuth oxide while bonding takes place. Whatever the mechperature above the melting point of bismuth, the bismuth members 20 soften and become firmly bonded both to the thermoelectric bodies 2 on the one hand and to the element 6 and the nickel plating 16 on the other hand. The clamped assembly is then removed from the bath, the clamp 24 is removed, and a reliable and firmly bonded assembly results. The bond produced exhibits excellent resistance to cyclic temperature variations to which the assembly may be subjected, despite the differences in physical expansion as between the thermoelectric bodies 2 and the objects to which they are bonded. Moreover, a highly satisfactory contact resistance, on the order of 50 micro-ohms per square centimeter, is produced at the surfaces 12 and 18 of the thermoelectric body 2, which value of contact resistance remains substantially constant with changes, and within wide cyclical changes, in the temperature to which the assembly is subjected.

While but a single embodiment of the present invention has been here specifically disclosed, it will be apparent that many variations may be made therein, all within the scope of the instant invention as defined in the following claims.

I claim:

1. The method of bonding bismuth telluride bodies to elements having surfaces formed of a substance from the group consisting of nickel, iron and steel which comprises inserting a bismuth member between said body and said element surface, pressing said element toward said body, and immersing the thus-pressed assembly in a bath consisting essentially of a substance from the group consisting of palmitic acid and stearic acid and combinations thereof, said bath being at a temperature above the melting point of bismuth.

2. The method of bonding bismuth telluride bodies to elements having surfaces formed of a substance from the group consisting of nickel, iron and steel which comprises inserting a thin bismuth member between said body and said element surface, pressing said element toward said body, and immersing the thus-pressed assembly in a bath consisting essentially of a substance from the group consisting of palmitic acid and stearic acid and combinations thereof, said bath being at a temperature above the melting point of bismuth.

3. The method of bonding bismuth telluride bodies to elements having surfaces formed of a substance from the group consisting of nickel, iron and steel which comprises inserting a bismuth member between said body and said element surface, pressing said element toward said body, and immersing the thus-pressed assembly in a fluxing bath of palm oil containing a substance from the group consisting of palmitic acid and stearic acid and combinations thereof, said bath being at a temperature on the order of 300° C.

4. The method of bonding bismuth telluride bodies to elements having surfaces formed of a substance from the group consisting of nickel, iron and steel which comprises inserting a thin bismuth member between said body and said element surface, pressing said element toward said body, and immersing the thus-pressed assembly in a fluxing bath of palm oil containing a substance from the group consisting of palmitic acid and stearic acid and combinations thereof, said bath being at a temperature on the order of 300° C.

5. The method of bonding bismuth-containing bodies to elements having surfaces formed of a substance from the group consisting of nickel, iron and steel which comprises inserting a bismuth member between said body and said element surface, pressing said element toward said body, and immersing the thus-pressed assembly in a bath consisting essentially of a substance from the group consisting of palmitic acid and stearic acid and combinations thereof, said bath being at a temperature above the melting point of bismuth.

6. The method of bonding bismuth-containing bodies to elements having surfaces formed of a substance from the group consisting of nickel, iron and steel which comprises inserting a thin bismuth member between said body and said element surface, pressing said element toward said body, and immersing the thus-pressed assembly in a bath consisting essentially of a substance from the group consisting of palmitic acid and stearic acid and combinations thereof, said bath being at a temperature above the melting point of bismuth.

References Cited in the file of this patent

UNITED STATES PATENTS

| | | |
|---|---|---|
| 699,592 | Thompson | May 6, 1902 |
| 1,865,752 | Gabor | July 5, 1932 |
| 2,811,571 | Fritts et al. | Oct. 29, 1957 |
| 2,844,867 | Wernz et al. | July 29, 1958 |
| 2,877,283 | Justi | Mar. 10, 1959 |
| 2,924,976 | Babiskin et al. | Feb. 16, 1960 |
| 3,017,693 | Haba | Jan. 23, 1962 |
| 3,045,341 | Kolenko et al. | July 24, 1962 |
| 3,054,174 | Rose et al. | Sept. 18, 1962 |

OTHER REFERENCES

Steel Magazine, Feb. 26, 1945, p. 87.